(12) United States Patent
Schutzman et al.

(10) Patent No.: US 10,504,257 B1
(45) Date of Patent: Dec. 10, 2019

(54) GRAPHICAL REPRESENTATION OF ACCOUNT OUTFLOW

(71) Applicant: Wells Fargo Bank, N.A., San Francisco, CA (US)

(72) Inventors: Erik Schutzman, Fort Mill, SC (US); Tambra Nichols, Charlotte, NC (US); Susan Bell McCraw, Mooresboro, NC (US); H. Brock Kolls, Alpharetta, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 51 days.

(21) Appl. No.: 15/960,912

(22) Filed: Apr. 24, 2018

(51) Int. Cl.
*G06Q 40/00* (2012.01)
*G06T 11/20* (2006.01)
*G06T 11/40* (2006.01)

(52) U.S. Cl.
CPC ............ *G06T 11/206* (2013.01); *G06Q 40/12* (2013.12); *G06T 11/40* (2013.01)

(58) Field of Classification Search
None
See application file for complete search history.

(56) References Cited

U.S. PATENT DOCUMENTS

| | | | | |
|---|---|---|---|---|
| 9,852,415 B2* | 12/2017 | Luoma | | G06Q 20/3221 |
| 2007/0100749 A1* | 5/2007 | Bachu | | G06Q 20/108 |
| | | | | 705/42 |
| 2010/0100469 A1* | 4/2010 | Buchanan | | G06Q 10/06 |
| | | | | 705/35 |
| 2010/0145773 A1* | 6/2010 | Desai | | G06Q 10/04 |
| | | | | 705/7.29 |
| 2012/0130869 A1* | 5/2012 | Shergill | | G06Q 40/02 |
| | | | | 705/30 |
| 2012/0130870 A1 | 5/2012 | Shergill et al. | | |
| 2014/0136381 A1* | 5/2014 | Joseph | | G06Q 40/02 |
| | | | | 705/35 |
| 2014/0164198 A1* | 6/2014 | Caldwell | | G06Q 40/00 |
| | | | | 705/35 |
| 2014/0222636 A1* | 8/2014 | Cheng | | G06Q 50/01 |
| | | | | 705/35 |
| 2014/0236789 A1* | 8/2014 | Caldwell | | G06Q 40/02 |
| | | | | 705/35 |

* cited by examiner

*Primary Examiner* — David H Chu
(74) *Attorney, Agent, or Firm* — Schwegman Lundberg & Woessner, P.A.

(57) ABSTRACT

Various examples are directed to computer-implemented systems and methods for graphical representation of financial account outflow. The method includes obtaining, by a processor of a computer, a transaction of an account holder including an amount and frequency of the transaction, and categorizing the transaction on a continuum of discretionary spending and fixed expense spending. The transaction is displayed by the processor on a user interface using a graph having an x-axis providing a frequency of the at least one transaction, and a y-axis indicating the categorization of the transaction. The transaction is displayed as a bubble on the graph, where the bubble has a diameter that is proportional to the amount of the transaction.

20 Claims, 6 Drawing Sheets

GRAPHICAL REPRESENTATION OF ACCOUNT OUTFLOW

TECHNICAL FIELD

Embodiments described herein generally relate to automated financial account management and, for example and without limitation, to systems and methods for graphical representation of financial account outflow.

BACKGROUND

A financial account holder may encounter situations in which it would be desirable to determine how the frequency and size of various account outflows affect the account holder's financial health.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

A financial account holder may encounter situations in which it would be desirable to determine how the frequency and size of various account outflows affect the account holder's financial health.

The present subject matter provides a system and method that enables a financial account holder to determine how the frequency and size of various account outflows affect the account holder's financial health. The method includes obtaining, by a processor of a computer, a transaction of an account holder including an amount and frequency of the transaction, and categorizing the transaction on a continuum of discretionary spending and fixed expense spending. The transaction is displayed by the processor on a user interface using a graph having an x-axis providing a frequency of the at least one transaction, a y-axis indicating the categorization of the transaction. The transaction is displayed as a bubble on the graph, wherein the bubble has a diameter that is proportional to the amount of the transaction, in various embodiments.

Figure 1A:
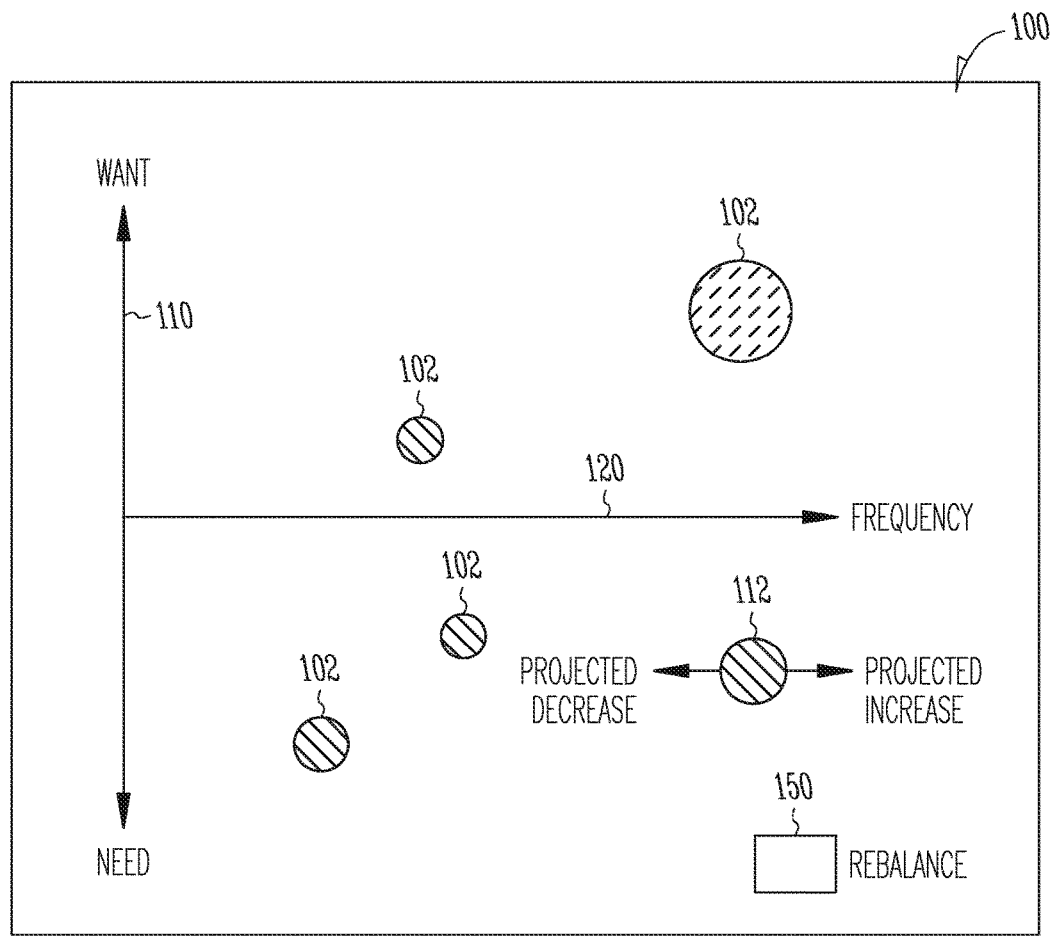
FIGS. 1A-1B illustrate example embodiments of a user interface for graphical representation of account outflows.
Figure 1B:
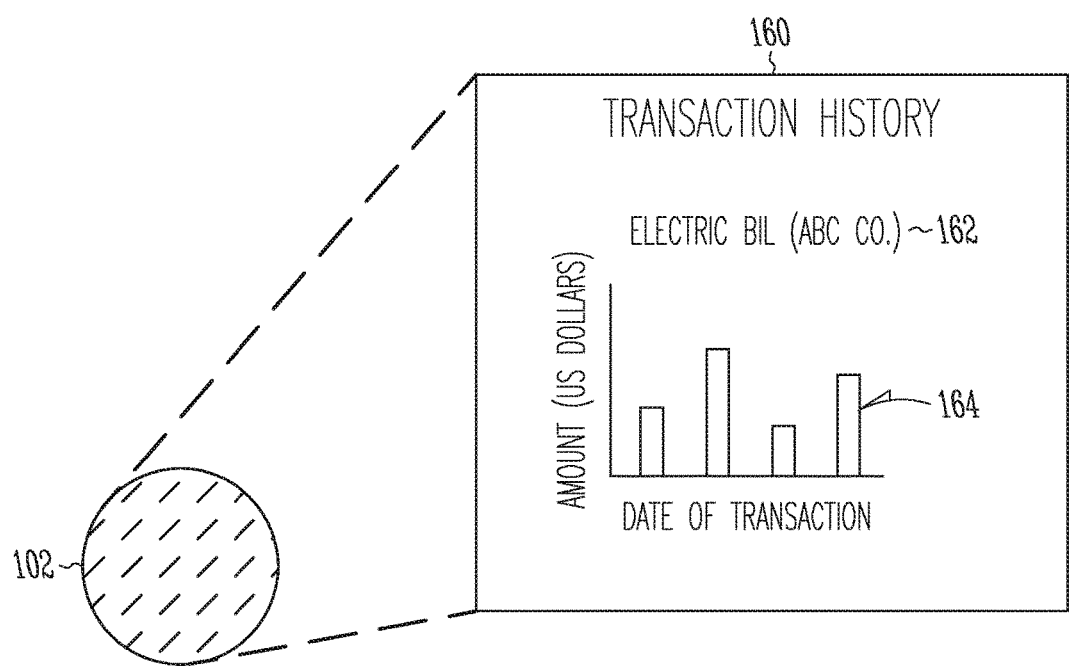

FIGS. 1A-1B illustrate example embodiments of a display or user interface 100 for graphical representation of account outflows, such as a graphical user interface (GUI). As shown in FIG. 1A, the y-axis 110 represents whether a transaction is a need or a want, where wants are discretionary spending and needs are fixed expenses. In some embodiments, needs can also include savings and investments. The categorization can be adjusted by the account holder or user, in various embodiments. The x-axis 120 represents the number of transactions, according to various embodiments. The bubbles 102, 112 have diameters that reflect an amount of the transaction, and can have a maximum diameter to help users visualize their budgets. The present subject matter provides several advantages, including providing a user-friendly way for users to visualize how their money is being spent and providing for user interaction with the display. Users can drag bubbles left or right (see bubble 112) to change the frequency at which they are making a transaction, and to visualize how changing the frequency of a transaction affects financial health of the user. In various embodiments, users can also change the size of the bubbles, to visualize how the amount of a transaction would affect their bottom line. For example, changing bubble size would provide a user with feedback about how their financial health would improve if they are able to reduce their electric bill by a specified amount. In various embodiments, the bubbles can be color coded by vendor, category, or relationship to overall budget. In the depicted embodiment, shading is used to represent color, with a first shading 130 indicating that the transaction is within the budget and a second shading 140 indicating that the transaction is outside of the account holder's budget. The present subject matter can be used in conjunction with a mobile wallet application, in various embodiments. In various embodiments, a secured interface is used by an account holder or user to interact with the present system.

A "rebalance" button 150 can be provided on the display or user interface 100, such as a GUI, that gives suggestions or recommendations for shrinking or moving bubbles to balance a user's budget, in various embodiments. The rebalance button 150 can be used after adjusting size or frequency of transactions to determine the effect of the adjustments on the overall budget, in an embodiment. In addition, the rebalance button 150 can be used after making deposits to the user account to determine a new budget. Certain transactions can be fixed in size or frequency, such as mortgage payments, and corresponding bubbles can be used that cannot be adjusted, in an embodiment. If the total of the outflow transactions is under the account holder's budget, a savings may be generated in an embodiment. In various embodiments, some bubbles can be moved off and on to the display if the bubble represents a transaction for seasonal or limited expenses, such as tuition.

As shown in FIG. 1B, a user can click on, swipe, or hover over a bubble 102 on the user interface to get transaction history 160, in an embodiment. The transaction history 160 can appear as a pop-up on the display or separate screen, and can include information about the transaction, including but not limited to payee information 162 and graphical information 164 showing amounts and dates of previous transactions, in some embodiments. In various embodiments, a user can hover a mouse over a bubble (or swipe a bubble) on the user interface to obtain information about the nature of the transaction, such as transaction history 160. In various embodiments, a user can interact with the bubble by changing the bubble size to determine a limit to the transaction that is still within the user's budget. In addition, a user can create new bubbles or customize existing bubbles to determine how future expenses will affect the user's budget, such as planned home renovations. Color coding or shading can be used to indicate if a transaction is new or recurring, in various embodiments. Various embodiments include providing for a three dimensional graphical output, where the z-axis includes a timing of the transaction to illustrate historical or future transactions. In this manner, a user can manipulate the image in a gyroscopic view to provide perspective on trending of the size and frequency of selected transactions.

In various embodiments, the present method includes receiving an input from the account holder to change the diameter of the bubble, and displaying, by the processor, the transaction on the user interface as a bubble with the changed diameter. The method further includes receiving an input from the account holder to change the location of the bubble by dragging the bubble on the user interface, and displaying the transaction on the user interface as a bubble with the changed location, in an embodiment. In various embodiments, displaying the transaction includes providing a color for the bubble, including providing a first color if the transaction is within a budget of the account holder and providing a second color if the transaction is beyond the budget of the account holder. The budget can be determined based on a balance of an account of the account holder, or based on balances of multiple accounts of the account holder. In one embodiment, the first color is green and the second color is red. Other colors can be used without departing from the scope of the present subject matter. According to various embodiments, the method includes displaying a rebalance button on the user interface that, when selected by the account holder, causes the processor to reallocate funds to one or more transactions based on a budget of the account holder. The transaction is displayed on the user interface using a graph having a z-axis providing timing of the at least one transaction as a past, present or future transaction, in an embodiment. In various embodiments, an input is received from the account holder selecting the transaction by clicking on the bubble on the user interface, and the transaction history of the transaction is provided on the user interface in response to the selection of the account holder. An input from the account holder selecting the transaction by hovering over the bubble can also be received on the user interface, and information about the transaction is displayed on the user interface in response to the selection of the account holder.

Various embodiments of the present subject matter include a system for graphical representation of account outflows. The system includes a computing device comprising at least one processor and a data storage device in communication with the at least one processor. The data storage device includes instructions thereon that, when executed by the at least one processor, causes the at least one processor to obtain a transaction of an account holder including an amount and frequency of the transaction, categorize the transaction on a continuum of discretionary spending and fixed expense spending, and display the transaction on a user interface using a graph. The graph includes an x-axis providing a frequency of the at least one transaction, and a y-axis indicating the categorization of the transaction. The transaction is displayed as a bubble on the graph, wherein the bubble has a diameter that is proportional to the amount of the transaction. In various embodiments, the computing device can include a laptop, tablet or cellular telephone. Other computing devices can be used without departing from the scope of the present subject matter.

In various embodiments, a non-transitory computer-readable storage medium is provided. The computer-readable storage medium includes instructions that when executed by computers, cause the computers to perform operations of obtaining a transaction of an account holder including an amount and frequency of the transaction, categorizing the transaction on a continuum of discretionary spending and fixed expense spending, and displaying the transaction on a user interface using a graph having an x-axis providing a frequency of the at least one transaction, a y-axis indicating the categorization of the transaction, including displaying the transaction as a bubble on the graph, where the bubble has a diameter that is proportional to the amount of the transaction. According to various embodiments, the bubble has a maximum diameter selected by the account holder. The bubble has a maximum diameter based on a balance of an account of the account holder, in an embodiment. In various embodiments, one or more bubbles are displayed using a color code to identify the transactions based on vendor, project or other category.

Figure 2:
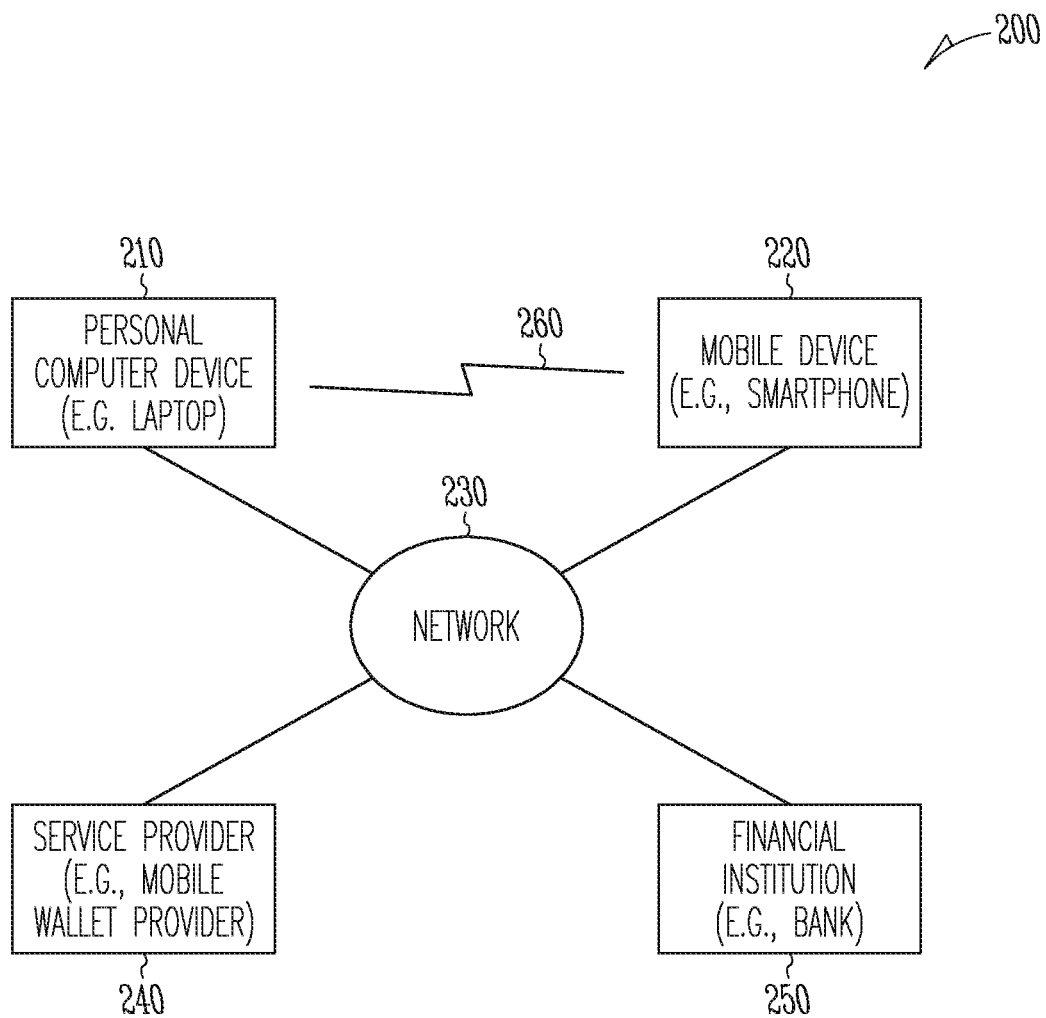
FIG. 2 illustrates an exemplary infrastructure for providing a graphical representation of financial account outflow.

FIG. 2 illustrates an exemplary infrastructure for providing a graphical representation of financial account outflow. The infrastructure comprises a personal computing device (e.g., laptop) 210, a mobile device (e.g., smartphone or wearable device) 220, a service provider 240, and a financial institution 250, a network 230, and a device network 260. The mobile device 220 is a mobile computing device such as smartphone, tablet computer, or other portable computing device. Exemplary mobile devices are Apple iPhone and Samsung Galaxy smartphone. Exemplary service providers are Apple, PayPal, and Samsung. The financial institution 250 is an organization that provides an account for the primary account holder, in various embodiments. Exemplary financial institutions are bank, credit/debit card companies, and the like.

The network 230 represents a virtual network that provides communication between entities 210, 220, 240 and 250. The network 230 can comprise Internet, LAN, Wi-Fi, home network, cellular network, NFC, and other types of networks, in various embodiments. The device network 260 is a wireless communication network between the mobile device 220 and personal computing device only. Exemplary wireless networks 260 are a Local area network (LAN), Personal Area Network (PAN), and body area network (BAN). The wireless network 260 can use Bluetooth, Near Filed Communication (NFC), Wi-Fi, ZigBee, or other wireless technology, in various embodiments.

Figure 3:
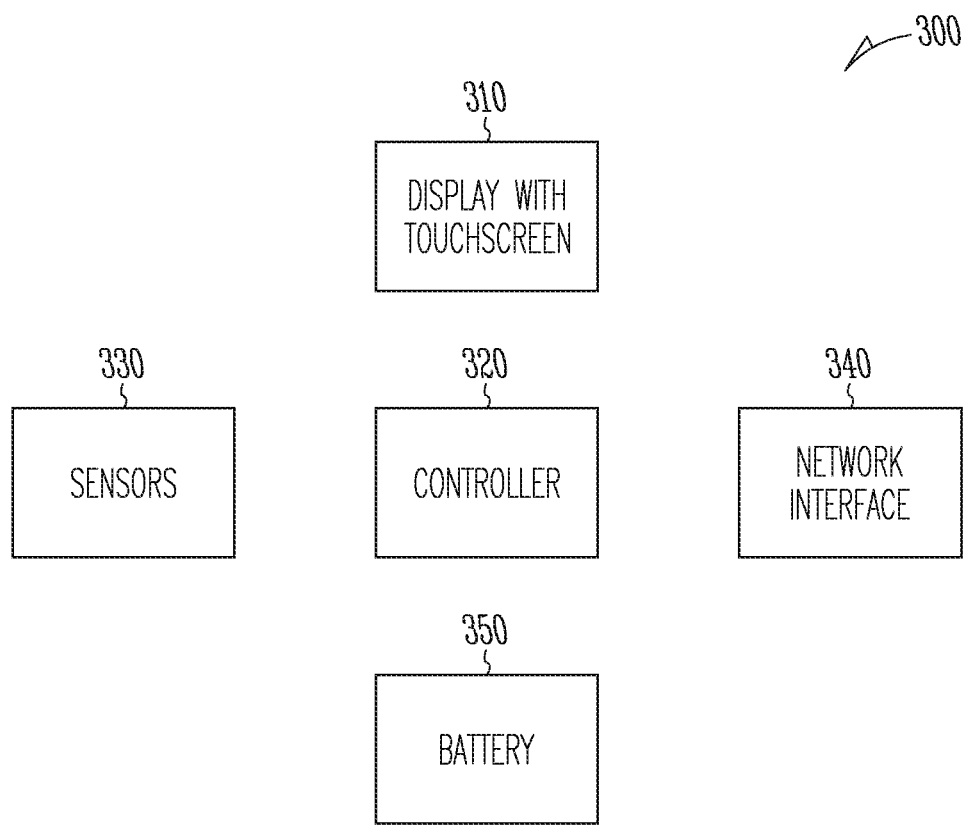
FIG. 3 illustrates an example embodiment of a computing device used by a user to initiate a transaction for a user account.

FIG. 3 illustrates an embodiment of computing device 300 used by a user to request a transaction for a user account. In the depicted embodiment, the computing device 300 includes a display with a touchscreen 310 interfaced with a controller or processor 320. The controller or processor 320 is electrically connected to one or more sensors 330, a network interface 340, and a battery 350 to supply power to the computing device 300, in various embodiments.

Figure 4:
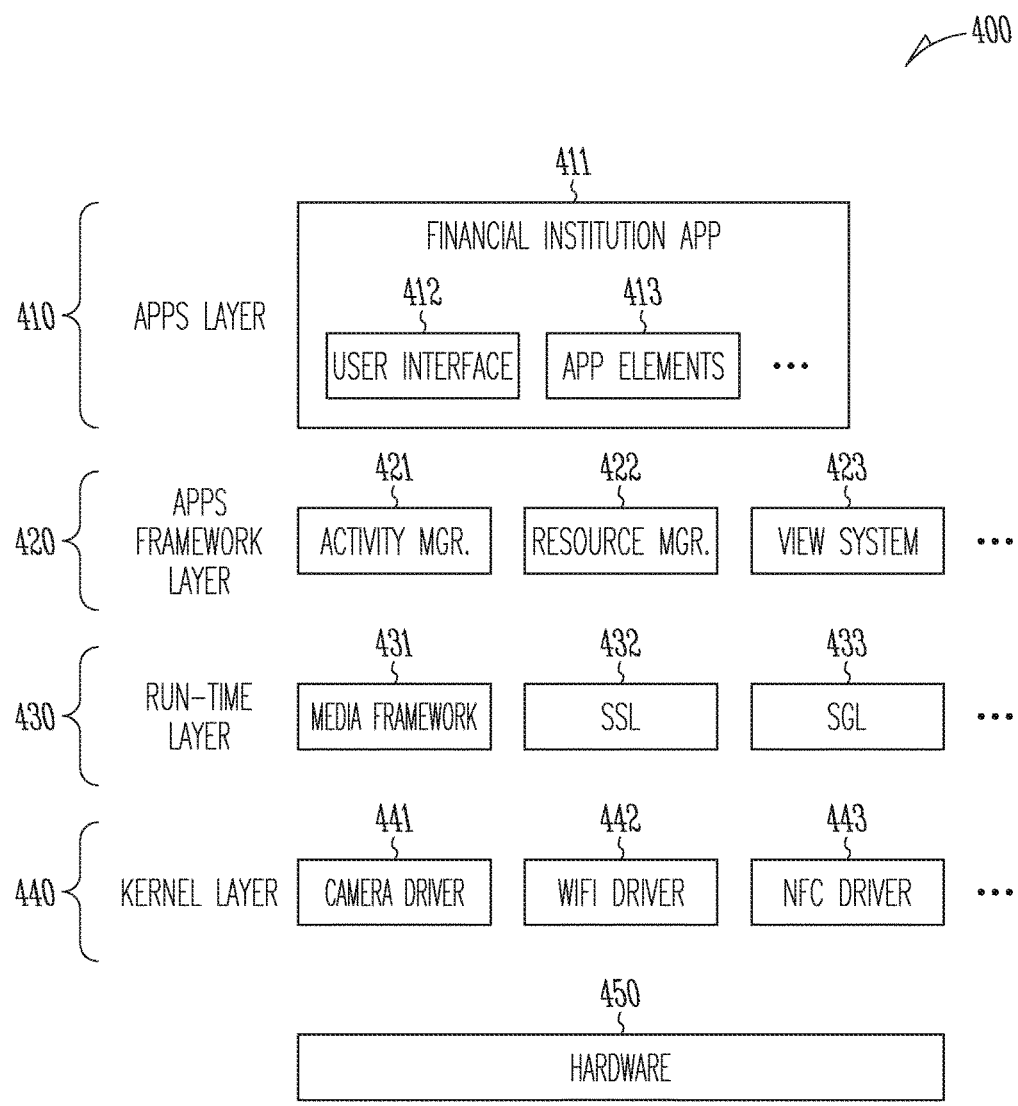
FIG. 4 illustrates an example embodiment of a computing device used for account transactions.

FIG. 4 illustrates an embodiment of a computing device 400 with a financial institution application 411. In various embodiments, the computing device 400 includes a mobile computing device such as a cellular telephone or smart phone. The depicted embodiment illustrates one example of software architecture executed on hardware 450, including one or more processors of the computing device 400. FIG. 4 is merely a non-limiting example of a software architecture and many other architectures can be implemented to facilitate the functionality described herein.

The representative hardware 450 comprises one or more processing units having associated executable instructions. Executable instructions represent the executable instructions of the software architecture, including implementation of the methods, modules, and components of the present subject matter. Hardware 450 also includes memory and/or storage modules, which also have executable instructions.

In the example architecture of FIG. 4, the software can be conceptualized as a stack of layers where each layer provides particular functionality. For example, the software can include layers such as an operating system, libraries, frameworks/middleware, applications and presentation layer. Other software architectures can include additional or different layers. The operating system can manage hardware resources and provide common services. The overall system can include, for example, a kernel layer 440, run-time layer 430, application framework layer 420 and application layer 410. The kernel layer 440 can act as an abstraction layer between the hardware and the other software layers. For example, the kernel layer 440 can be responsible for memory management, processor management (e.g., scheduling), component management, networking, security settings, and so on. The drivers can be responsible for controlling or interfacing with the underlying hardware. For instance, the drivers can include display drivers, camera drivers 441, Bluetooth® drivers, flash memory drivers, serial communication drivers (e.g., Universal Serial Bus (USB) drivers), Wi-Fi® drivers 442, near field communication (NFC) drivers 443, audio drivers, power management drivers, and so forth depending on the hardware configuration.

The run-time layer 430 can include a media framework 431, a secure sockets layer (SSL) 432 and a secure group layer (SGL) 433, in various embodiments. The application framework layer 420 can include an activity manager 421, a resource manager 422, and a view system application 423, in various embodiments. The application layer 410 can include built-in applications and/or third party applications. Examples of representative built-in applications can include, but are not limited to, a contacts application, a browser application, a book reader application, a location application, a media application, a messaging application, and/or a game application. Third party applications can include any of the built in applications as well as a broad assortment of other applications. In a specific example, the third party application (e.g., an application developed using the Android™ or iOS™ software development kit (SDK) by an entity other than the vendor of the particular platform) can be mobile software running on a mobile operating system such as iOS™, Android™, Windows® Phone, or other mobile operating systems. In this example, the third party application can invoke application programming interface (API) calls provided by the operating system to facilitate functionality described herein. A financial institution application 411 can implement the functionality of a mobile wallet application, in one embodiment. The mobile wallet application can be a built-in or third party application, and can include a user interface 412 and application elements 413 in various embodiments.

The applications in application layer 410 can utilize built in operating system functions (e.g., kernel, services and/or drivers), libraries, frameworks and middleware to create user interfaces to interact with users of the system. Alternatively, or additionally, in some systems interactions with a user can occur through a presentation layer. In these systems, the application/module "logic" can be separated from the aspects of the application/module that interact with a user.

Figure 5:
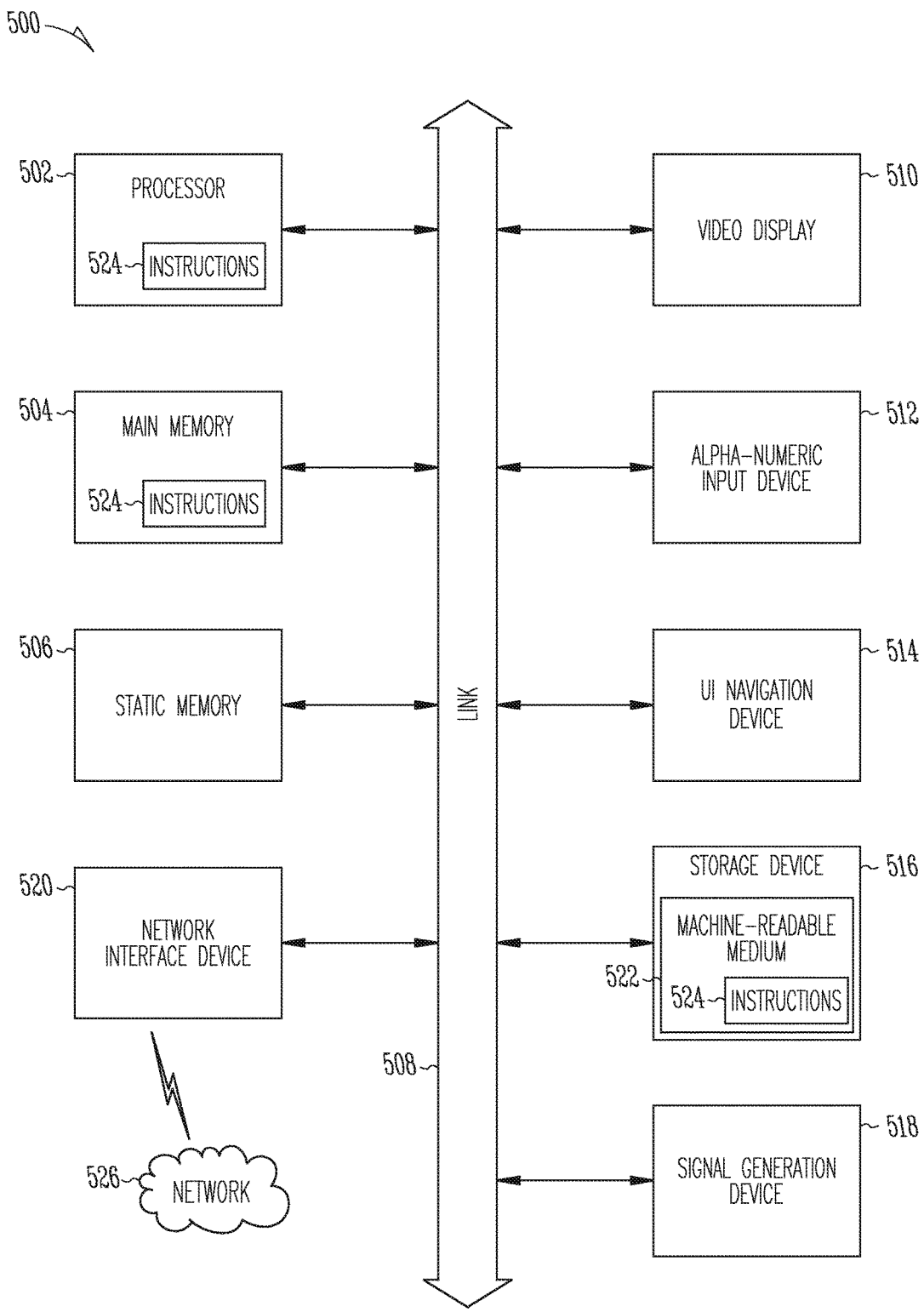
FIG. 5 is a block diagram of a machine in the example form of a computer system within which a set of instructions can be executed, for causing the machine to perform any one or more of the methodologies discussed herein.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
    obtaining, by a processor of a computer, a transaction of an account holder including an amount and frequency of the transaction;
    categorizing, by the processor, the transaction on a continuum of discretionary spending and fixed expense spending; and
    displaying, by the processor, the transaction on a user interface using a graph having an x-axis providing a frequency of the at least one transaction, a y-axis indicating the categorization of the transaction, including displaying the transaction as a bubble on the graph, wherein the bubble has a diameter that is proportional to the amount of the transaction.

2. The method of claim 1, further comprising:
    receiving, by the processor, an input from the account holder to change the diameter of the bubble; and
    displaying, by the processor, the transaction on the user interface as a bubble with the changed diameter.

3. The method of claim 1, further comprising:
    receiving, by the processor, an input from the account holder to change the location of the bubble by dragging the bubble on the user interface; and
    displaying, by the processor, the transaction on the user interface as a bubble with the changed location.

4. The method of claim 1, wherein displaying the transaction includes providing a color for the bubble.

5. The method of claim 4, wherein providing a color for the bubble includes providing a first color if the transaction is within a budget of the account holder and providing a second color if the transaction is beyond the budget of the account holder.

6. The method of claim 5, wherein the budget is determined based on a balance of an account of the account holder.

7. The method of claim 5, wherein the budget is determined based on balances of multiple accounts of the account holder.

8. The method of claim 5, wherein the first color is green and the second color is red.

9. The method of claim 1, further comprising:
    displaying, by the processor, a rebalance button on the user interface that, when selected by the account holder, causes the processor to reallocate funds to one or more transactions based on a budget of the account holder.

10. The method of claim 1, further comprising:
    displaying, by the processor, the transaction on the user interface using a graph having a z-axis providing timing of the at least one transaction as a past, present or future transaction.

11. The method of claim 1, further comprising:
    receiving, by the processor, an input from the account holder selecting the transaction by clicking on the bubble on the user interface; and
    displaying, by the processor, transaction history of the transaction on the user interface in response to the selection of the account holder.

12. The method of claim 1, further comprising:
    receiving, by the processor, an input from the account holder selecting the transaction by hovering over the bubble on the user interface; and
    displaying, by the processor, information about the transaction on the user interface in response to the selection of the account holder.

13. A system comprising:
    a computing device comprising at least one processor and a data storage device in communication with the at least one processor, wherein the data storage device comprises instructions thereon that, when executed by the at least one processor, causes the at least one processor to:
        obtain, by the at least one processor, a transaction of an account holder including an amount and frequency of the transaction;
        categorize, by the at least one processor, the transaction on a continuum of discretionary spending and fixed expense spending; and
        display, by the at least one processor, the transaction on a user interface using a graph having an x-axis providing a frequency of the at least one transaction, a y-axis indicating the categorization of the transaction, including displaying the transaction as a bubble on the graph, wherein the bubble has a diameter that is proportional to the amount of the transaction.

14. The system of claim 13, wherein the computing device includes a laptop.

15. The system of claim 13, wherein the computing device includes a tablet.

16. The system of claim 13, wherein the computing device includes a cellular telephone.

17. A non-transitory computer-readable storage medium, the computer-readable storage medium including instructions that when executed by computers, cause the computers to perform operations of:
    obtaining a transaction of an account holder including an amount and frequency of the transaction;

categorizing the transaction on a continuum of discretionary spending and fixed expense spending; and displaying the transaction on a user interface using a graph having an x-axis providing a frequency of the at least one transaction, a y-axis indicating the categorization of the transaction, including displaying the transaction as a bubble on the graph, wherein the bubble has a diameter that is proportional to the amount of the transaction.

18. The non-transitory computer-readable storage medium of claim 17, wherein the bubble has a maximum diameter selected by the account holder.

19. The non-transitory computer-readable storage medium of claim 17, wherein the bubble has a maximum diameter based on a balance of an account of the account holder.

20. The non-transitory computer-readable storage medium of claim 17, wherein one or more bubbles are displayed using a color code to identify the transactions based on vendor, project or other category.

* * * * *